United States Patent
Nakamura et al.

(10) Patent No.: US 9,692,033 B2
(45) Date of Patent: Jun. 27, 2017

(54) MANUFACTURING METHOD OF SEALED BATTERY

(71) Applicants: Kosuke Nakamura, Nisshin (JP); Tomohiro Ono, Miyoshi (JP); Masaki Koike, Nagoya (JP)

(72) Inventors: Kosuke Nakamura, Nisshin (JP); Tomohiro Ono, Miyoshi (JP); Masaki Koike, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/974,645

(22) Filed: Aug. 23, 2013

(65) Prior Publication Data
US 2014/0059847 A1   Mar. 6, 2014

(30) Foreign Application Priority Data

Sep. 3, 2012 (JP) ................................. 2012-193609

(51) Int. Cl.
| | |
|---|---|
| H01M 2/30 | (2006.01) |
| H01M 2/02 | (2006.01) |
| H01M 2/04 | (2006.01) |
| H01M 2/06 | (2006.01) |
| H01M 10/04 | (2006.01) |

(52) U.S. Cl.
CPC ............. *H01M 2/30* (2013.01); *H01M 2/022* (2013.01); *H01M 2/0404* (2013.01); *H01M 2/06* (2013.01); *H01M 10/0481* (2013.01); *Y10T 29/4911* (2015.01)

(58) Field of Classification Search
CPC ...... H01M 2/00; H01M 10/00; H01M 2/0413; H01M 2/04; H01M 2/30
USPC .......................................................... 29/623
See application file for complete search history.

(56) References Cited

U.S. PATENT DOCUMENTS

| | | | |
|---|---|---|---|
| 6,183,905 B1* | 2/2001 | Ling | ............................. 429/181 |
| 2003/0047005 A1 | 3/2003 | Stalnaker et al. | |
| 2011/0223472 A1* | 9/2011 | Ikeda et al. | .................. 429/174 |
| 2012/0058390 A1* | 3/2012 | Obayashi | ................ H01M 2/30 |
| | | | 429/179 |
| 2012/0183845 A1* | 7/2012 | Kawamoto et al. | .......... 429/179 |

FOREIGN PATENT DOCUMENTS

| | | |
|---|---|---|
| CN | 1564936 A | 1/2005 |
| CN | 102195013 A | 9/2011 |
| CN | 102593409 A | 7/2012 |
| JP | A-2010-282848 | 12/2010 |

* cited by examiner

*Primary Examiner* — Helen O.K. Conley
*Assistant Examiner* — Victoria Lynch
(74) *Attorney, Agent, or Firm* — Oliff PLC

(57) ABSTRACT

The invention provides a manufacturing method of a sealed battery that includes a power generating element, a housing member, a lid member, a collector terminal member, and a first insulating member. This manufacturing method includes compressing the first insulating member with a protruding portion of the lid member. The method includes measuring a position of the lid member and a compression load applied by the lid member, and stopping compressing when a slope of the change in the compression load with respect to the position of the lid member reaches a predetermined value.

2 Claims, 7 Drawing Sheets

F I G . 2
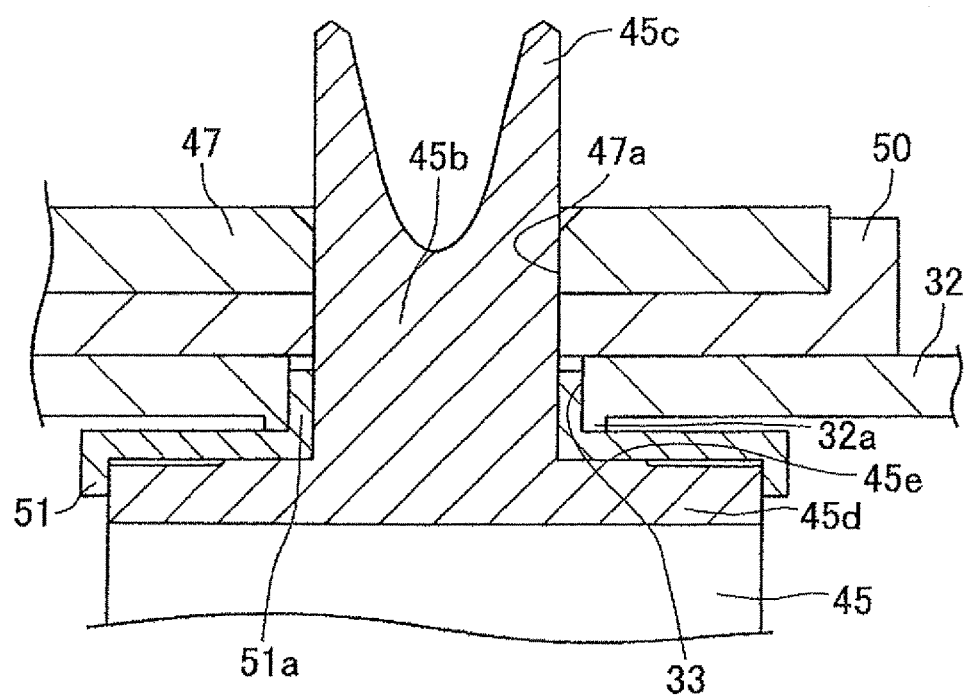

MANUFACTURING METHOD OF SEALED BATTERY

INCORPORATION BY REFERENCE

The disclosure of Japanese Patent Application No. 2012-193609 filed on Sep. 3, 2012 including the specification, drawings and abstract is incorporated herein by reference in its entirety.

BACKGROUND OF THE INVENTION

1. Field of the Invention

The invention relates to a manufacturing method of a sealed battery, and more particularly, to technology for manufacturing a terminal structure of a sealed battery.

2. Description of Related Art

In a sealed battery, a power generating element of the sealed battery is housed in an outer covering of the sealed battery. Inside the covering, a collector terminal member that passes through the covering and protrudes outside is arranged on both a positive terminal side and a negative terminal side. One end of the collector terminal member is electrically connected to the power generating element inside of the covering. The other end of the collector terminal member is electrically connected to an external terminal member on the outside of the covering. Thus, technology for transferring electric power between the inside and the outside of the battery is known.

A plate-like connecting member is sometimes used to electrically connect the other end of the collector terminal member to the external terminal member on the outside of the covering. Technology that involves connecting the other end of the collector terminal member and the connecting member by crimping the other end of the collector terminal member to an insertion hole formed in the connecting member is known (see Japanese Patent Application Publication No. 2010-282848 (JP 2010-282848 A), for example).

In JP 2010-282848 A, a lid member that forms the covering is electrically insulating from the collector terminal member by interposing an insulating member between the lid member and the collector terminal member. In some cases, the insulating member is compressed by a protruding portion formed on the lid member, to give the insulating member sealing performance.

FIG. 7 is a view of an F curve showing the relationship between the position of the lid member in the direction of compression, and the compression load applied by the lid member. When there is variation in a dimension such as the size of the protruding portion of the lid member or the thickness of the insulating member, a difference occurs in the F-S curve, as shown by curves A and B. In this case, if compression of the insulating member is stopped based on the size of the compression load, such as load F1 in FIG. 7, variation (width X in FIG. 7) in the position (i.e., the compression dimension) of the lid member will occur, which may result in a difference in sealing performance of the insulating member.

SUMMARY OF THE INVENTION

The invention thus provides a manufacturing method of a sealed battery, in which the sealing performance of an insulating member is able to be made constant even if there is variation in a dimension such as the size of a protruding portion of a lid member or the thickness of the insulating member.

One aspect of the invention relates to a manufacturing method of a sealed battery that includes a power generating element; a housing member in which the power generating element is housed and that is a tubular shape with a bottom; a lid member that closes off an opening of the housing member, and has a through-hole and a protruding portion that protrudes on a side with the housing member, around the through-hole; a collector terminal member of which a first end has a cylindrical shape, is inserted through the through-hole, and extends outside of the lid member, and a second end is connected to the power generating element inside of the housing member; and a first insulating member that electrically insulates the lid member from the collector terminal member by being interposed between the collector terminal member and the lid member, on the housing member side of the lid member. The manufacturing method includes compressing the first insulating member with the protruding portion of the lid member. The manufacturing method includes measuring a position of the lid member and a compression load applied by the lid member, and stopping compressing when a slope of the change in the compression load with respect to the position of the lid member reaches a predetermined value.

According to this structure, when manufacturing a sealed battery, the sealing performance of the insulating member is able to be made constant even if there is variation in a dimension such as the size of the protruding portion of the lid member or the thickness of the insulating member.

In the manufacturing method described above, the sealed battery may also include a crimping portion provided on the first end of the collector terminal member, and an external terminal member that is connected to the collector terminal member on a side of the lid member opposite the housing member side, and that has an insertion hole. The manufacturing method may further include joining the first end to the external terminal member by crimping the crimping portion to the insertion hole after the compressing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein;

FIG. 2 is an enlarged sectional view of a terminal portion of the battery before an insulating member is compressed, according to the example embodiment;

DETAILED DESCRIPTION OF EMBODIMENTS

Next, an example embodiment of the invention will be described. The technical scope of the invention is not limited to the example embodiment described below.

The invention made apparent from the description in the specification and the accompanying drawings broadly covers the entire scope of truly intended technical aspects.

Figure 1A:
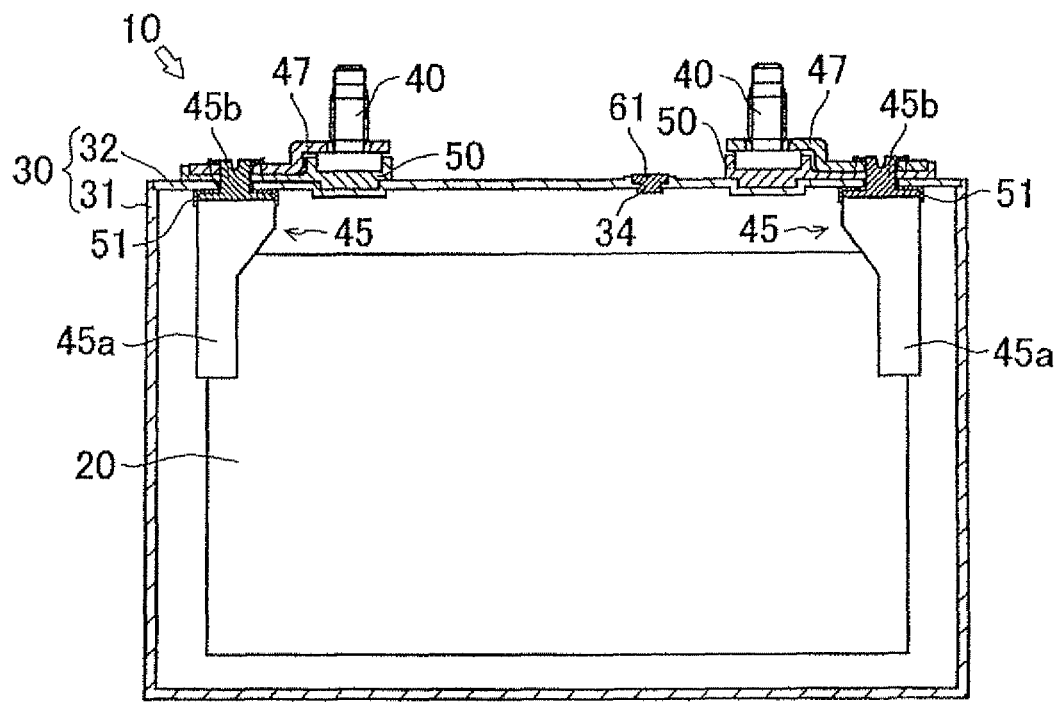
FIG. 1A front sectional view schematically showing the structure of a battery according to an example embodiment of the invention.
Figure 1B:
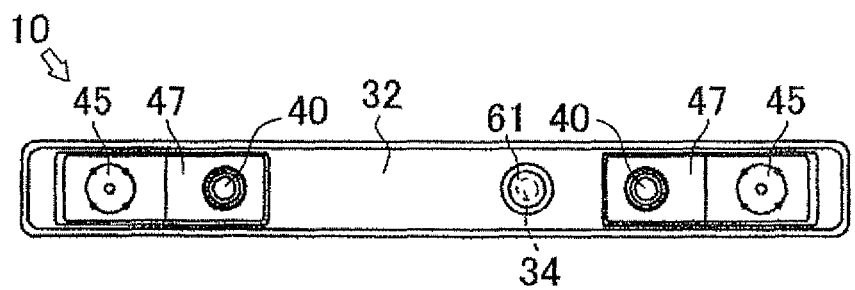
FIG. 1B is a plan view of the battery according to the example embodiment.

The general structure of a battery 10 that is a sealed battery according to this example embodiment will be described with reference to FIGS. 1A, 1B and 2. The battery 10 of this example embodiment is a lithium-ion secondary battery. The battery 10 includes, as its main constituent elements, a power generating element 20, a covering 30, fastening members 40, collector terminal members 45, first insulating members (gaskets) 51, external terminal members 47, and second insulating members 50. In this specification, elements and the like that are provided in plurality will be described in the singular when possible to facilitate understanding of the invention. The covering 30 has, a housing member 31 and a lid member 32. The power generating element 20 is housed inside of the covering 30. The fastening member 40 protrudes to the outside from the covering 30. One end of the collector terminal member 45 is connected to the power generating element 20, and the other end of the collector terminal member 45 extends outside of the covering 30. The first insulating member 51 is a resin lid member interposed between the collector terminal member 45 and the covering 30. The external terminal member 47 is a plate member that is connected to the collector terminal member 45 on the outside (i.e., the side opposite the housing member 31 side) of the covering 30. The second insulating member 50 is a resin lid member interposed between the external terminal member 47 and the covering 30.

The power generating element 20 is an element in which an electrode body, in which a positive electrode, a negative electrode, and a separator are stacked or rolled, is impregnated with an electrolyte. When the battery 10 is charging or discharging, a chemical reaction takes place inside the power generating element 20, causing current to flow (strictly speaking, ions move via through the electrolyte between the positive electrode and the negative electrode).

The covering 30 is a rectangular column-shaped can that has the metal housing member 31 and the metal lid member 32. The housing member 31 is a rectangular member that has a tubular shape with a bottom and in which one side is open. The power generating element 20 is housed inside of this housing member 31. The lid member 32 is a flat plate rectangular member having a shape that corresponds to the open side (i.e., the opening) of the housing member 31. The lid member 32 joins together with the housing member 31 in a state closing off the opening of the housing member 31.

As shown in FIG. 2, a through-hole 33 through which a first end (i.e., the upper end in FIG. 1A in this example embodiment) 45b of the collector terminal member 45 is able to be inserted is formed in the lid member 32 of the covering 30. The through-hole 33 is a hole that has a predetermined inside diameter, and passes through the covering 30 (i.e., the lid member 32) in the thickness direction thereof. A protruding portion 32a that protrudes on the side with the housing member 31 (i.e., the lower side in FIG. 1A; i.e., the inside of the covering 30) is formed in an annular shape around the through-hole 33 (see FIGS. 2 to 4).

A pouring hole 34 is open toward the center of the lid member 32. The pouring hole 34 is a through-hole that has a predetermined inside diameter, and passes through the lid member 32 in the thickness direction of the lid member 32. The pouring hole 34 is used to pour electrolyte into the covering 30 in which the power generating element 20 has been housed in advance. After the electrolyte is poured in, the pouring hole 34 is then sealed by a sealing member 61.

The first insulating member 51 (that corresponds to the insulating member in the claims) is a generally annular plate-shaped member that is arranged on an upper side of the collector terminal member 45 and has a cylindrical gasket 51a that is inserted into the through-hole 33. The first insulating member 51 is interposed between the collector terminal member 45 and the lid member 32, on the housing member 31 side of the lid member 32. The gasket 51a is inserted into the through-hole 33. The first insulating member 51 electrically insulates the lid member 32 from the collector terminal member 45 by being compressed by the protruding portion 32a formed on the lid member 32 and the collector terminal member 45 (see FIGS. 3 and 4). The second insulating member 50 electrically insulates the lid member 32 of the covering 30 from the external terminal member 47. For the material of the second insulating member 50 and the first insulating member 51, material having a good high-temperature creep property, i.e., material having lasting creep resistance with respect to the thermal cycle of the battery 10, such as PA66 or PFA for example, is preferably used.

The fastening member 40 is a columnar-shaped member arranged on the second insulating member 50 in a state with a first end thereof (i.e., the upper end in FIG. 1A in this example embodiment) protruding to the outside, on the upper surface of the lid member 32. A portion (i.e., a tip end of the first end) of the fastening member 40 that protrudes outside of the battery 10 is threaded, thus forming a bolt.

A second end 45a (i.e., a bottom end in FIG. 1A of this example embodiment) of one collector terminal member 45 is connected to a positive electrode of the power generating element 20, and a second end 45a of the other collector terminal member 45 is connected to a negative electrode of the power generating element 20. A first end 45b (i.e., an upper end in FIG. 1A in this example embodiment) is formed in a cylindrical shape. The first end 45b is inserted through the through-hole 33 of the lid member 32 and protrudes outside (upward in FIG. 1A) the lid member 32. A crimping portion 45c that is crimped to an insertion hole 47a of the external terminal member 47, as will be described later, is formed on the first end 45b. A flat plate portion 45d is formed, parallel to the lid member 32, between the second end 45a and the first end 45h of the collector terminal member 45. A flat portion 45e formed raised with, respect to the other portion is formed around the first end 45b on the upper surface of the flat plate portion 45d. For the material of the collector terminal member 45, aluminum may be used on the positive electrode side and copper may be used on the negative electrode side, for example.

The external terminal member 47 is a conductive plate member formed in a crank shape when viewed from the front. The external terminal member 47 is electrically connected to the positive electrode or the negative electrode of the power generating element 20 via the collector terminal member 45. The external terminal member 47 and the collector terminal member 45 serve as energizing paths for drawing power stored in the power generating element 20 outside or taking power from outside into the power generating element 20. An external terminal hole and the insertion hole 47a (see FIG. 2) that pass through the external terminal member 47 in the thickness direction thereof are open in the external terminal member 47. The first end 45b of the collector terminal member 45 is inserted through the insertion hole 47a. Also, as shown in FIG. 4, the external terminal member 47 is connected to the collector terminal member 45 by the crimping portion 45c formed on the side with the first end 45b of the collector terminal member 45 being crimped to the insertion hole 47a. The crimped crimping portion 45c of the collector terminal member 45 spreads out in a circular plate shape as shown in FIG. 4. An outer peripheral-side end portion of the crimping portion 45c that is spread out in a circular plate shape is welded to the external terminal member 47 in order to ensure conductivity between the collector terminal member 45 and the external terminal member 47. The fastening member 40 is inserted through the external terminal hole of the external terminal member 47. In this way, the collector terminal member 45 is connected to the fastening member 40 on the outside (i.e., the side opposite the housing member 31 side) of the lid member 32 by the external terminal member 47, Next, a procedure for compressing the first insulating member 51, and a procedure for crimping the crimping portion 45c of the collector terminal member 45 to the insertion hole 47a after compressing the first insulating member 51, will be described with reference to FIGS. 2 to 4. Before crimping the first insulating member 51, the first insulating member 51 is placed on the upper surface of the flat plate portion 45d of the collector terminal member 45, with the first end 45b of the collector terminal member 45 inserted through the inside of the gasket 51a, as shown in FIG. 2. At this time, a lower surface of the first insulating member 51 corresponds to the flat portion 45e formed raised with respect to the surrounding portion on the upper surface of the flat plate portion 45d. Therefore, a gap is formed between the lower surface of the first insulating member 51 and the portion of the flat plate portion 45d other than the flat portion 45e.

Also, the first end 45b of the collector terminal member 45 is inserted through the lid member 32, the second insulating member 50, and the external terminal member 47, and the protruding portion 32a of the lid member 32 is abutted against the upper surface of the first insulating member 51. At this time, the gasket 51a is inserted into the through-hole 33. In this state, the protruding portion 32a is abutting against the first insulating member 51, so a gap is formed between the first insulating member 51 and the portion of the lid member 32 other than the protruding portion 32a. In this way, the first insulating member 51 is interposed between the lid member 32 and the flat plate portion 45d of the collector terminal member 45.

Figure 3:
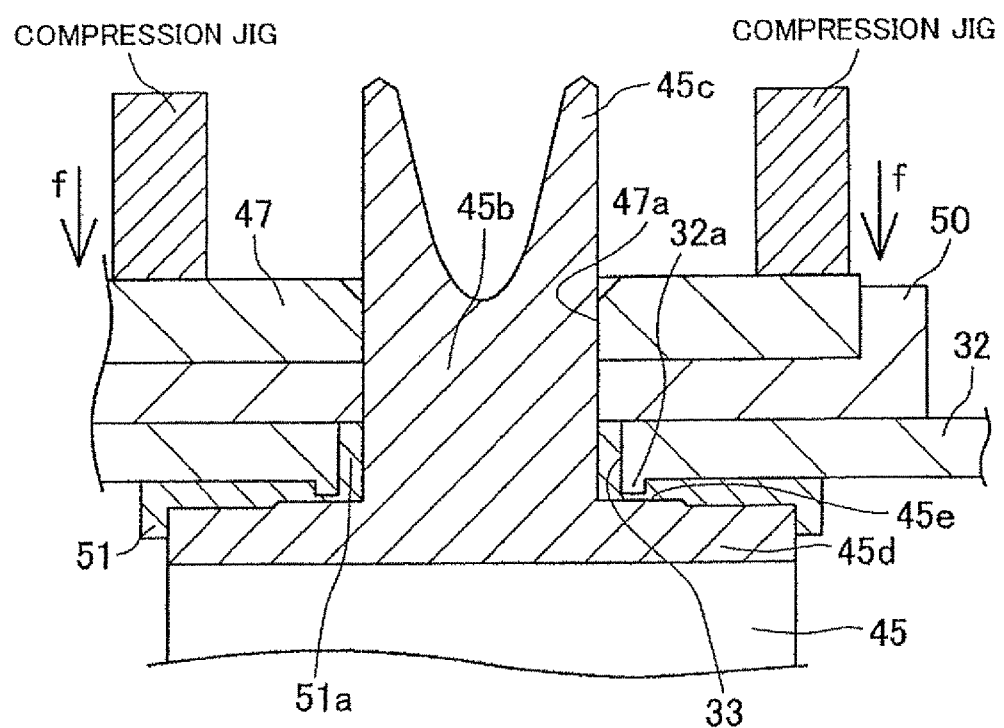
FIG. 3 is an enlarged sectional view of the terminal portion of the battery after the insulating member is compressed, according to the example embodiment.
Figure 4:
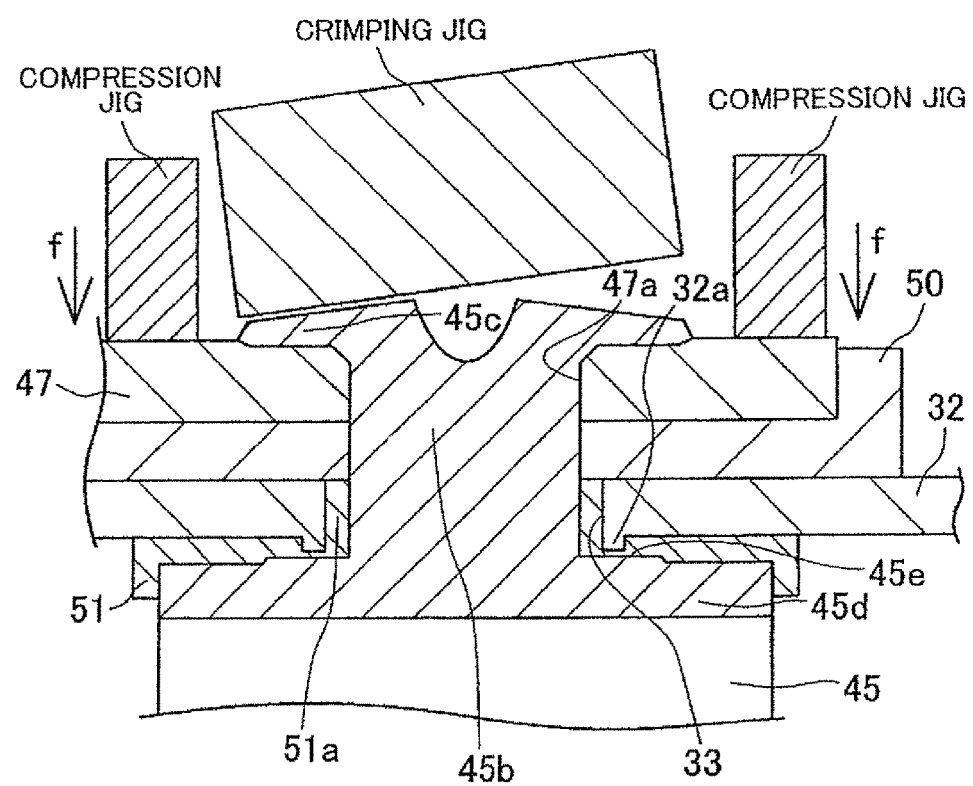
FIG. 4 is an enlarged sectional view of a terminal portion of the battery after crimping, according to the example embodiment.

Next, when compressing the first insulating member 51 (i.e., in a compression step), a compression jig is abutted against the upper side of the external terminal member 47 and presses in the direction indicated by arrow f in FIG. 3 from above. As a result, the first insulating member 51 is compressed by the protruding portion 32a of the lid member 32 and the flat portion 45e of the collector terminal member 45, as shown in FIG. 3. At this time, the first insulating member 51 works into (i.e., is squeezed into) the gap formed between the lower surface of the first insulating member 51 and the portion of the upper surface of the flat plate portion 45d other than the flat portion 45e, and the gap formed between the upper surface of the first insulating member 51 and the portion of the lid member 32 other than the protruding portion 32a. Thus, these gaps are eliminated.

Next, when crimping the crimping portion 45c to the insertion hole 47a of the external terminal member 47 (i.e., in a crimping step), the crimping portion 45c is pushed radially outward (i.e., flared outward) by a crimping jig. As a result, the first end 45b of the collector terminal member 45 and the external terminal member 47 are joined together so as to be unable to be displaced relative to one other. Then, even if the pressure from the compression jig is released, the crimping portion 45c that is flared outward abuts against the external terminal member 47, so the first insulating member 51 will not return to its original shape from elasticity. The force with which the first insulating member 51 tries to return to its original shape from elasticity is used to ensure sealing performance between the collector terminal member 45 and the lid member 32.

Figure 5A:
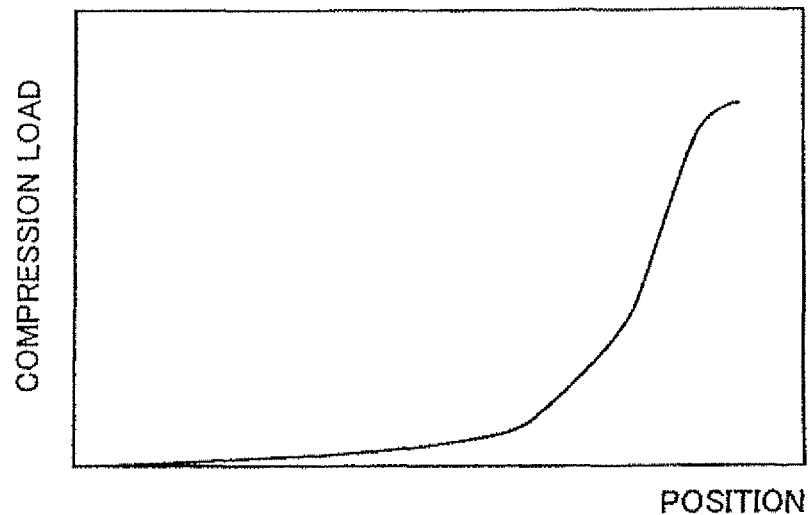
FIG. 5A is a view showing the relationship between a position of a lid member and a compression load applied by the lid member, according to the example embodiment.
Figure 5B:
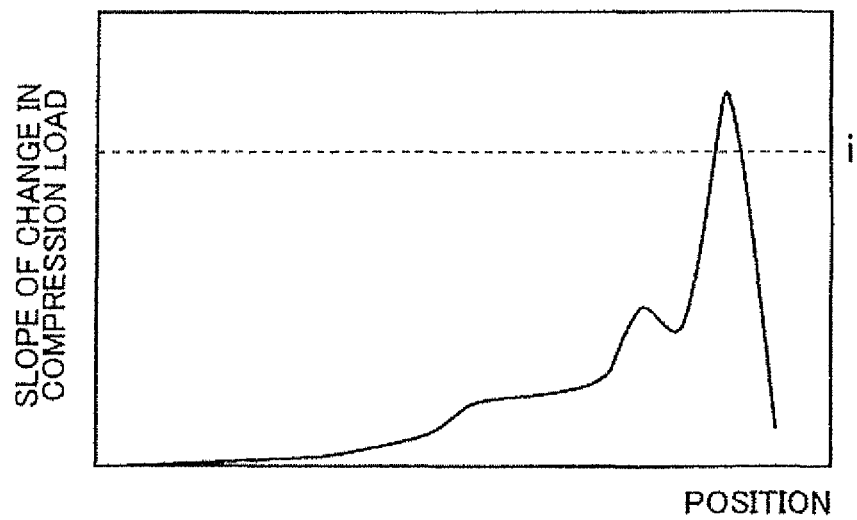
FIG. 5B is a view of a slope of change in the compression load with respect to the position of the lid member, according to the example embodiment.

In the manufacturing method of the battery 10 according to this example embodiment, a change in a position in the direction of compression of the lid member 32 (i.e., the compression stroke of the first insulating member 51 by the compression jig), and a compression load applied to the first insulating member 51 by the lid member 32 (i.e., the compression load applied by the compression jig) is measured. More specifically, the position of the lid member 32 is obtained by a linear gauge or an encoder or the like, and the compression load applied to the first insulating member 51 by the lid member 32 is obtained by a load cell or the like. Then, at the point a slope of change in the compression load with respect to the position of the lid member 32 reaches a predetermined value, the compression step ends and the crimping step begins. More specifically, the slope of the relationship between the position of the lid member 32 and the compression load applied by the lid member 32, that is shown in FIG. 5A, is calculated as shown in FIG. 5B. The compression step ends at the point the slope of the change in the compression load with respect to the position of the lid member 32 reaches a predetermined value i shown in FIG. 5B, for example, after compression starts.

In this example embodiment, with a structure such as that described above, even if there is variation in a dimension such as the size of the protruding portion 32a of the lid member 32 or the thickness of the first insulating member 51, the sealing performance of the first insulating member 51 is able to be made constant. More specifically, even if there is a difference in an F-S curve indicating the relationship between the position of the lid member 32 and the compression load applied by the lid member 32 due to variation in the dimension, the position of the lid member 32 at which the slope of the change in the compression load reaches the predetermined value will not greatly change. Thus, as described above, even if there is variation in the dimension, variation in the position of the lid member 32 (i.e., the compression dimension) is able to be inhibited. That is, a difference in the sealing performance of the first insulating member 51 is able to be inhibited compared with when compression of the first insulating member 51 is stopped based on the size of the compression load.

Figure 6:
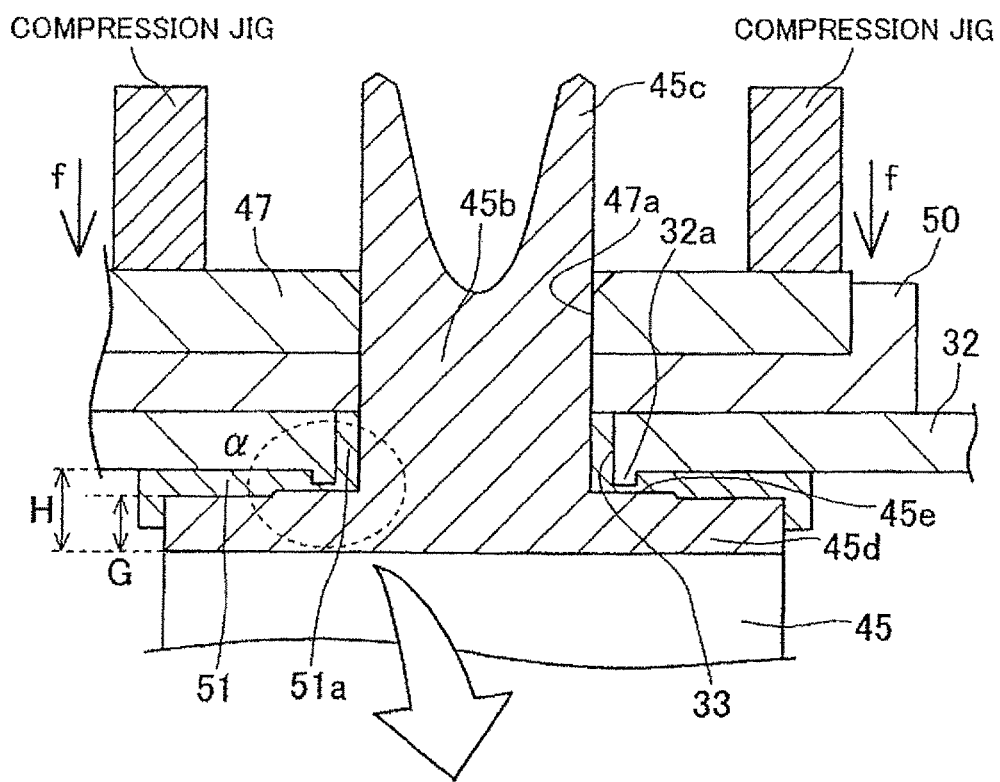
FIG. 6 is a view of the dimensions of the terminal portion of the battery after a gasket is compressed, according to the example embodiment.
Figure 6:
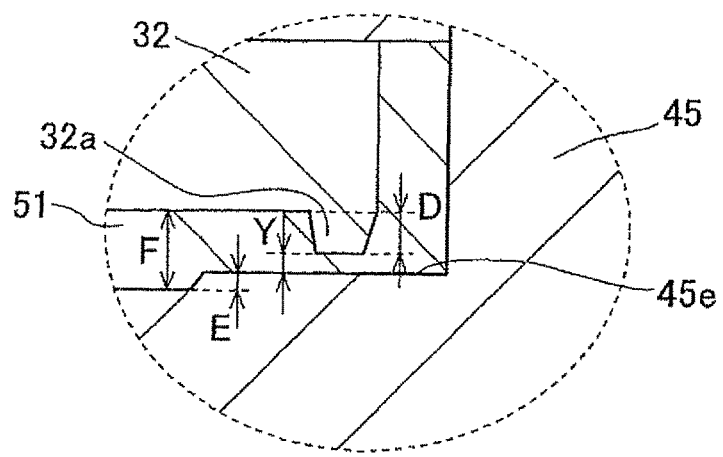
Figure 7:
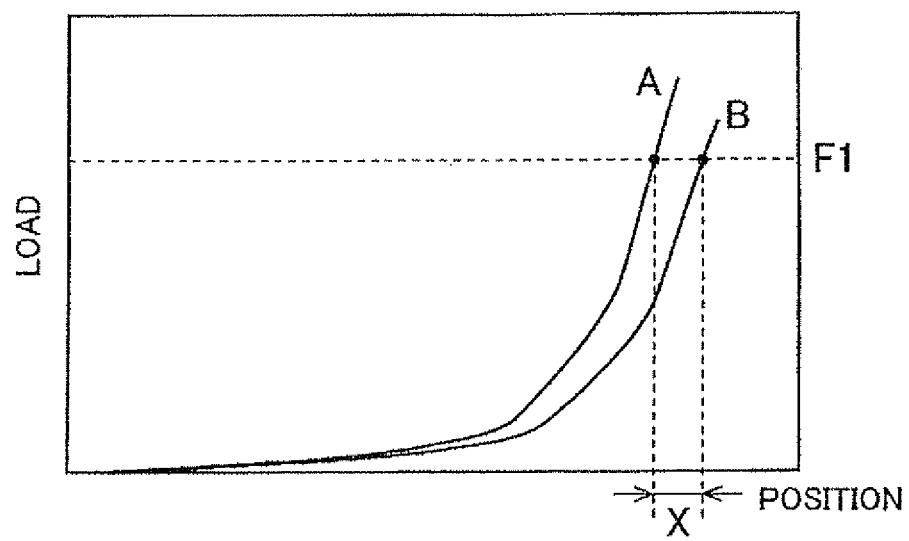
FIG. 7 is a view of the relationship between the compression load applied by the lid member and the position of the lid member when there is variation in the dimensions of the member.

Next, a method for ensuring the quality of the sealing performance of the first insulating member 51 will be described with reference to FIG. 6. A dimension suitable for ensuring the sealing performance of the first insulating member 51 is the distance between the protruding portion 32a and the flat portion 45e after the first insulating member 51 is compressed (i.e., the thickness of the first insulating member 51 that is compressed by the protruding portion 32a and the flat portion 45e; dimension Y in FIG. 6). Hereinafter, a method for calculating the dimension Y will be described.

First, a dimension F after the first insulating member 51 is compressed is calculated by subtracting a dimension G from a dimension H (i.e., F=H−G). The dimension G is the thickness from the lower surface (i.e., the surface on the housing member side) of the flat plate portion 45d to a portion of the flat plate portion 45d that is not the flat portion 45e. The dimension H is a distance from the lower surface (i.e., the surface on the housing member side) of the flat plate portion 45d to the lower surface (i.e., the surface on the housing member side) of the lid member 32. That is, the dimension F after the first insulating member 51 is compressed is the distance from the lower surface of the lid member 32 to the surface of a portion of the flat plate portion 45d that is not the flat portion 45e, after compression. The dimension G that is the thickness of the flat portion 45e may be measured in advance, or, if the component tolerance of each member is small, the design dimensions of the parts may be used. The dimension H that is the distance from the lower surface of the flat plate portion 45d to the lower surface of the lid member 32 is measured by a linear gauge or a non-contact displacement sensor or the like. The dimension H may be measured either before or after the crimping step of the crimping portion 45e, as long as it is after the first insulating member 51 is compressed.

Next, the dimension Y is calculated by subtracting a protrusion height D and a protrusion height E from the dimension F after the first insulating member 51 is compressed (i.e., Y=F−(D+E)). The protrusion height D is the height of the protruding portion 32a. The protrusion height E is the height of the flat portion 45e. The protrusion height D of the protruding portion 32a and the protrusion height E of the flat portion 45e are determined by the design dimensions of the parts. In this example embodiment, the flat portion 45e is formed, but a structure in which the protrusion height E of the flat portion 45e is zero (Le., in which there is no step) is also possible by not forming the flat portion 45e.

In this example embodiment, the dimension Y (i.e., the thickness of the first insulating member 51 compressed by the protruding portion 32a and the flat portion 45e, i.e., the distance between the protruding portion 32a and the flat portion 45e) is calculated as described above. The quality of the sealing performance of the first insulating member 51 is ensured by thee determining whether this dimension Y is within a predetermined dimension range.

What is claimed is:
1. A manufacturing method of a sealed battery that includes:
a power generating element;
a housing member in which the power generating element is housed and that is a tubular shape with a bottom;
a lid member that closes off an opening of the housing member, and has a through-hole and a protruding portion that protrudes from an edge of the through-hole on a side facing an inside of the housing member toward the housing member;
a collector terminal member including a first end having a cylindrical shape, the first end inserted through the through-hole and extending outside of the lid member, and a second end connected to the power generating element inside of the housing member; and
a first insulating member that is elastic, is interposed between the collector terminal member and the lid member to electrically insulate the lid member from the collector terminal member, and is provided on a housing member side of the lid member,
the manufacturing method comprising:
compressing the first insulating member with the protruding portion of the lid member,
measuring a position of the lid member and a compression load applied by the lid member during the compressing,
calculating, from the measuring, a slope of a change in the compression load applied by the lid member with respect to the position of the lid member, and
after the slope of a change in the compression load with respect to the position of the lid member reaches a local maximum, stopping compressing when a slope of a change in the compression load with respect to the position of the lid member reaches a predetermined value,
wherein the predetermined value is greater than a value of the local maximum, and
wherein the slope of the change in the compression load with respect to the position of the lid member decreases after the local maximum and then increases after the decrease.

2. The manufacturing method according to claim 1, wherein
the sealed battery also includes a crimping portion and an external terminal member, and
the crimping portion is provided on the first end of the collector terminal member, and the external terminal member is connected to the collector terminal member on an opposite side of the lid member from the housing member, and has an insertion hole,
the manufacturing method further comprising joining the first end to the external terminal member by crimping the crimping portion to the insertion hole after the compressing.

* * * * *